June 12, 1945.  L. S. WILLIAMS  2,378,274
WEIGHING SCALE
Filed Nov. 17, 1941  2 Sheets-Sheet 1
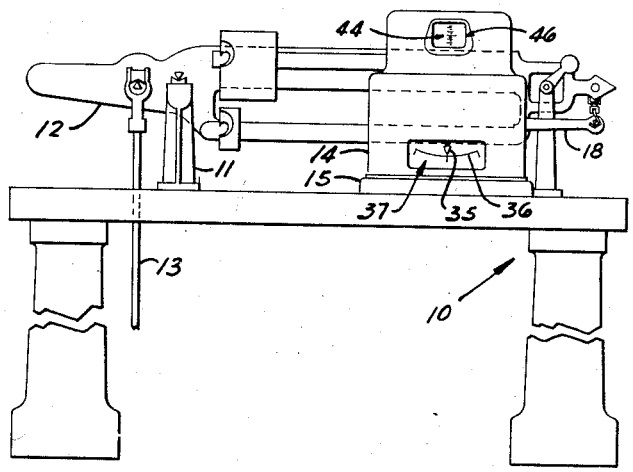
Fig. I
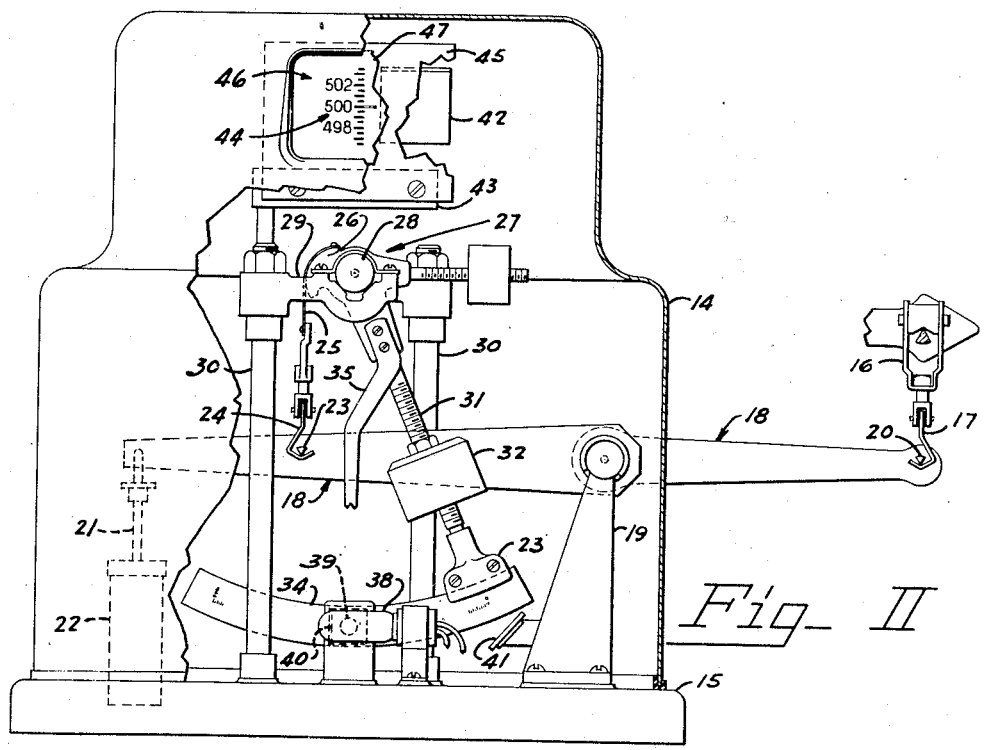
Fig. II
Lawrence S. Williams
INVENTOR
BY Marshall and Marshall
ATTORNEYS June 12, 1945.  L. S. WILLIAMS  2,378,274
WEIGHING SCALE
Filed Nov. 17, 1941  2 Sheets-Sheet 2
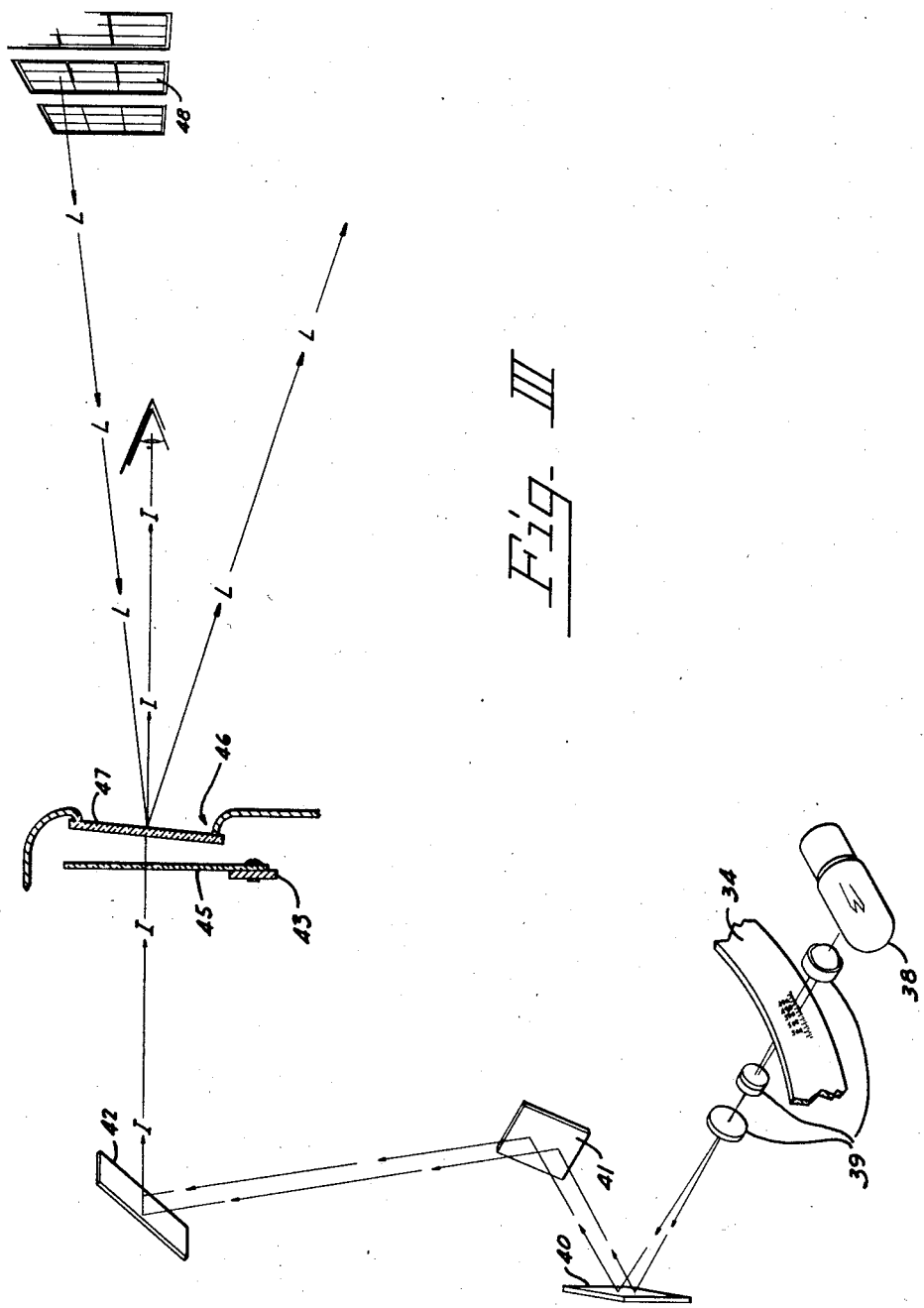
Fig. III
Lawrence S. Williams
INVENTOR
BY Marshall & Marshall
ATTORNEYS Patented June 12, 1945

2,378,274

UNITED STATES PATENT OFFICE 2,378,274

WEIGHING SCALE

Lawrence S. Williams, Toledo, Ohio, assignor to Toledo Scale Company, Toledo, Ohio, a corporation of New Jersey Application November 17, 1941, Serial No. 419,408

1 Claim. (Cl. 88—24)

This invention relates to weighing scales of the type in which an image of the weight indicia is projected onto a screen to give a clear, bright indication of the value of the load on the scale, and more particularly to means for protecting the legibility of such a projected image.

Projecting scales have been developed to solve the problem of providing a large number of large legible indicia to indicate a wide range of weight with minor variations of weight. In other types of scales, such as dial, cylinder or beam scales, the size of the movable portion of the weight indicating means and the distance through which it can be moved by the weighing scale are limited because such movable portion must be kept light enough in weight so that it will not cause errors in the operation of the scale itself. The projection scale overcomes these difficulties by the use of a light small-sized transparent chart on which can be exhibited a large number of minute indicia which can then be enlarged, through projection, to a much greater visual size than the size of indicia which can be borne by any other type of scale.

Because of the fact that the projected image is carried by light beams, its legibility may be destroyed by interfering light rays which may strike the screen on which the image is projected. For this reason, projecting scale screens are often times protected by shields or hoods, or are located inside of the scale housing and viewed through windowed openings in the housing. Such shields or hoods are not entirely desirable because they project from the surface of the housing and may be damaged. Windowed openings in the scale housing add to the difficulty by providing another reflecting surface from which light from windows, or other sources, may be reflected into the eyes of the observer and thus decrease the legibility of the projected image of the weight indicia.

It is an object of this invention to provide a projection weighing scale in which the screen and the projected image thereon may be viewed undisturbed by reflected light.

It is another object of this invention to provide a method for mounting a glass in an opening in the housing of a measuring instrument through which a projected image is to be viewed which glass will not reflect light from outside sources and thus lessen or destroy the legibility of the projected indication.

More specific objects and advantages are apparent from the description, in which reference is had to the accompanying drawings illustrating a preferred form of scale embodying the invention.

In the drawings:

Fig. I is a view in elevation of a weighing scale head incorporating projecting mechanism embodying the invention.

Fig. II is a view on a greatly enlarged scale of a load counterbalancing and projecting attachment embodying the invention, portions being broken away to more clearly show the details of the mechanism.

Fig. III is a schematic diagram illustrating the path of light carrying the projected image of the weighing indicia and the path of outside light.

These specific drawings and the specific description that follows merely disclose and illustrate the invention and are not intended to impose limitations upon the claim.

Mounted on a main frame 10 is a fulcrum stand 11 on which is pivotally supported a weighing scale beam 12. A pull rod 13, which is connected to load receiving mechanism (not shown), is pivotally connected to the load pivot of the beam 12. A housing 14 is mounted on a base 15 (Fig. II) which is in turn mounted on the frame 10. A link 16 is pivotally suspended from that end of the beam 12 opposite its load pivot and has a bearing yoke 17 attached to its lower end.

A main lever 18 is pivotally mounted on brackets 19, supported on the base 15, and extends horizontally parallel to and beneath the beam 12. One end of the lever 18 extends out of the housing 14 and has a pivot 20 in its outermost end which rests in the bearing yoke 17. The opposite end of the lever 18 is connected to a vertically extending rod 21 which is the plunger of a motion damping dashpot 22 mounted on the base 15. A pivot 23 is attached to the main lever 18 and rests in a bearing link 24, attached to the lower end of a metallic ribbon 25 which extends upwardly overlying the arcuate face of a sector cam 26. The ribbon 25 is fastened to the upper portion of the face of the cam 26 which is a portion of a load counterbalancing pendulum 27 pivotally mounted in bearings 28 clamped in a cross arm 29 supported by posts 30. The pendulum 27 consists of the sector cam 26 and a stem 31 on which is adjustably mounted a pendulum weight 32 and at the lower end of which is attached a clamp 33. An arcuate transparent indicia bearing chart 34 is mounted in the clamp 33. An indicator 35 (see also Fig. I) is fastened on the pendulum 27 and cooperates with an arcuate chart 36 over which it sweeps to indicate the approximate load on the scale. The chart 36 is visible through an opening 37 in the front of the housing 14.

A lamp 38 (see also Fig. III) is mounted in front of the vertical plane of movement of the chart 34 and projects light through a lens system 39 and the chart 34 towards the rear of the housing 14. The light passing through the chart 34 carries an image of that indicium on the chart 34 which represents the weight of the load on the scale necessary to swing the pendulum 27 and the chart 34 to the position which it assumes. The light projected toward the rear of the housing 14 strikes a mirror 40, which is in line with the lamp 38 and the projection lenses 39, and which is set to reflect the light toward the right of the housing 14 where it strikes a second mirror 41 and is reflected upwardly through the interior of the housing 14. The light then strikes and is further reflected by a third mirror 42 located near the back of the housing 14 and mounted on a bracket 43 supported by one of the posts 30. The mirror 42 reflects the light towards the front of the housing and an image 44 of the indicia on the chart 34 appears on a screen 45 also supported by the bracket 43. The screen 45 is visible through an aperture 46 in the housing 14 which is closed by a glass plate 47.

The glass plate 47 is tilted forward from the vertical at an angle of approximately five to ten degrees. As can be seen in Fig. III, light emanating from windows 48, or other outside source (as shown by the arrows L) is reflected by the tilted plate 47 so that it does not follow the path of the light carrying the image of the chart 34 (shown by the arrows I) and thus does not enter the eye of the observer to dilute light from the image 44 on the screen 45.

The embodiment of the invention that has been disclosed may be modified to meet various requirements.

Having described the invention, I claim:

In a weighing scale, in combination, an optical system for projecting an enlarged image of indicia indicative of loads weighed on said scale, a screen upon which said images are projected, a housing enclosing said optical system and said screen, said housing being provided with an opening in a substantially vertical wall of said housing through which said screen may be viewed, a transparent plate for glazing said opening, said transparent plate being inclined forwardly such that a line perpendicular to said plate and the line of sight to said screen can not coincide and that extraneous light from other sources cannot reflect along the line of sight.

LAWRENCE S. WILLIAMS.